US010571901B2

(12) United States Patent
Naidoo et al.

(10) Patent No.: US 10,571,901 B2
(45) Date of Patent: Feb. 25, 2020

(54) CONTROLLED ROLL-OUT OF MODULE CLASSES

(71) Applicant: FISHER-ROSEMOUNT SYSTEMS, INC., Round Rock, TX (US)

(72) Inventors: Julian K. Naidoo, Cedar Park, TX (US); Daniel R. Strinden, Austin, TX (US); Cristopher Ian Sarmiento Uy, Manila (PH); Prashant Joshi, Leicester (GB)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 39 days.

(21) Appl. No.: 15/671,834

(22) Filed: Aug. 8, 2017

(65) Prior Publication Data

US 2019/0049932 A1 Feb. 14, 2019

(51) Int. Cl.
*G05B 19/418* (2006.01)
*G06F 8/71* (2018.01)

(52) U.S. Cl.
CPC ... *G05B 19/4188* (2013.01); *G05B 19/41865* (2013.01); *G06F 8/71* (2013.01); *G05B 2219/31418* (2013.01); *G05B 2219/32137* (2013.01); *G05B 2219/32154* (2013.01)

(58) Field of Classification Search
CPC ..................................... G06F 8/51; G06F 8/65
USPC ....................................................... 712/210
See application file for complete search history.

(56) References Cited

U.S. PATENT DOCUMENTS

| 7,043,311 | B2 | 5/2006 | Nixon et al. |
| 2006/0025875 | A1 | 2/2006 | Smith et al. |
| 2007/0113051 | A1* | 5/2007 | Salpakari .................. G06F 8/51 |
| | | | 712/210 |

(Continued)

FOREIGN PATENT DOCUMENTS

GB 2 444 857 A 6/2008

OTHER PUBLICATIONS

Amadeo, "Balky carriers and slow OEMs step aside: Google is defragging Android" Sep. 2, 2013, 5 pg. Printout; accessed at https://web.archive.org/web/20131108055918/https://arstechnica.com/gadgets/2013/09/balky-carriers-and-slow-oems-step-aside-google-is-defragging-android/ (Year: 2013).*

(Continued)

*Primary Examiner* — Emilio J Saavedra
(74) *Attorney, Agent, or Firm* — Marshall, Gerstein & Borun LLP

(57) ABSTRACT

Module-based systems and methods are described for controlled roll-out of module classes for configuring a process plant. In various aspects the module-based systems and methods generate a second version of a module class based on a modification to a first version of the module class, where the module class is associated with one or more module instances that are each associated with a process control element of the process plant. The module-based systems and methods execute a roll-out instruction to update an upgraded process control element, where the upgraded process control element is associated with a new module instance based on the second version of the module class. The roll-out instruction is also designed to ignore or skip a non-upgraded process control element, where the non-upgraded process control element remains associated with a (Continued)

previous module instance based on the first version of the module class.

42 Claims, 10 Drawing Sheets

(56) References Cited

U.S. PATENT DOCUMENTS

| | | | | |
|---|---|---|---|---|
| 2011/0078675 A1* | 3/2011 | Van Camp | ................ | G06F 8/65 |
| | | | | 717/170 |
| 2014/0282469 A1* | 9/2014 | Johnson | .................... | G06F 8/65 |
| | | | | 717/170 |
| 2014/0344798 A1* | 11/2014 | Sasaki | ................ | G05B 19/0426 |
| | | | | 717/170 |

OTHER PUBLICATIONS

Search Report for Application No. GB1812513.8, dated Dec. 17, 2018.

\* cited by examiner

CONTROLLED ROLL-OUT OF MODULE CLASSES

TECHNICAL FIELD

The present invention relates generally to process plants and, more particularly, to a controlled roll-out of module classes for configuring a process plant.

DESCRIPTION OF THE RELATED ART

Distributed process control systems, like those typically used in power generation, chemical manufacturing, petroleum processing, industrial manufacturing or other types of plants, typically include one or more controllers communicatively coupled to a plurality of field devices via analog, digital, combined analog/digital, or wireless buses. The field devices, which may be, for example, valves, valve positioners, switches, transmitters (e.g., temperature, pressure, level and flow rate sensors), burners, heat exchangers, furnaces, etc. are located within the plant environment and perform process functions such as opening or closing valves, measuring process parameters, etc. in response to control signals developed and sent by the controllers. Smart field devices, such as the field devices conforming to any of the well-known Fieldbus protocols, may also perform control calculations, alarming functions, and other functions commonly implemented within or by a plant controller. The plant controllers, which are also typically located within the plant environment, receive signals indicative of process measurements made by the field devices and/or other information pertaining to the field devices and execute a control application that executes, for example, different control modules which make process control decisions, generate process control signals based on the received information and coordinate with the control modules or blocks being executed in the field devices, such as HART™ and FOUNDATION™ based Fieldbus field devices. The control modules within the controller send the process control signals over the communication lines or networks to the field devices to thereby control the operation of the process.

Information from the field devices and the controller is usually made available over a data highway to one or more other computer devices, such as operator workstations, personal computers, data historians, report generators, centralized databases, etc., typically placed in control rooms or other locations away from the harsher plant environment. These computer devices may also run applications that may, for example, enable an operator to perform functions with respect to the process, such as changing settings of the process control routine, modifying the operation of the control modules within the controller or the field devices, viewing the current state of the process, viewing alarms generated by field devices and controllers, keeping and updating a configuration database, etc.

As an example, the OVATION™ control system, sold by EMERSON PROCESS MANAGEMENT, includes multiple applications stored within and executed by different devices located at diverse places within a process plant. A configuration application, which resides in one or more operator workstations, enables users to create or change process control modules and to download these process control modules via a data highway to dedicated distributed controllers. Typically, these control modules are made up of communicatively interconnected function blocks, which are objects in an object oriented programming protocol and which perform functions within the control scheme based on inputs thereto and provide outputs to other function blocks within the control scheme. The configuration application may also allow a designer to create or change operator interfaces, which are used by a viewing application to display data to an operator and to enable the operator to change settings, such as set-points, within the process control routine. Each of the dedicated controllers and, in some cases, field devices, stores and executes a controller application that runs the control modules assigned and downloaded thereto to implement actual process control functionality. The viewing applications, which may be run on one or more operator workstations, receive data from the controller application via the data highway and display this data to process control system designers, operators, or users using the user interfaces. A data historian application is typically stored in and executed by a data historian device that collects and stores some or all of the data provided across the data highway while a configuration database application may be executed in a still further computer attached to the data highway to store the current process control routine configuration and data associated therewith. Alternatively, the configuration database may be located in the same workstation as the configuration application.

Presently, a process plant can be configured with module classes and their respective module objects (also known as module instances). A "module class" is a template for a particular type of module, e.g. a control module. A "module instance" of a class is effectively a "child" of the module class that has been instantiated from, and is therefore based on, its parent module class.

A module instance can correspond to a particular element in the process control system. For example, a valve class may have numerous valve instances, where each instance corresponds to a unique valve in the process plant. The module instances run live in computer memory and can store data related to the valve and/or execute functions to control the valve. In existing implementations, for example, as described by U.S. Pat. No. 7,043,311, entitled, "Module Class Objects in a Process Plant Configuration System," module instances can be created from their respective module class objects, where the module objects are said to be associated with and owned by the module class.

In current systems, a one-to-one mapping is maintained between a module class and an instance of that module class for use within a process plant. In current systems, multiple, live versions of module instances cannot exist for a given module class. As such, when a modification to a class is made, all child module instances must likewise be modified, and, as such, all module instances for the module class are immediately impacted by a change to the module class. As a result, any new module instances instantiated for the module class, or any changes made to the module class, are automatically reflected in, and propagated to, each of the module instances associated with that module class object. As described by U.S. Pat. No. 7,043,311, when a number of module instances have been created from a particular module class, where each of the different module instances have been tied to different process entities, each of the different module instances is automatically changed simply by invoking a change to the module class. For example, the changes are automatically propagated down to the associated module instances in the process plant.

This can, however, create problems within a process plant especially in process plants that contain numerous, varying types, or different configurations of hardware, including, for example, a process plant that contains numerous, varying types, or different configurations of field devices, process control elements, such as CHARMs, position switches, etc. For example, if an operator of a process plant, such as an engineer, desired to upgrade the hardware of the process plant, where the new hardware required a new module class—and therefore required new respective module instances (e.g., to control the new hardware)—then, in order to maintain the one-to-one mapping for all similar hardware in the plant, the operator would need to update and install all new versions of the hardware at once, and remove all of the old hardware associated with the old module class and its respective module instances. On the one hand, such an procedure would ensure that all of the new module instances were of the same version and, thus, would maintain the one-to-one mapping between the new module class and the new module instances for the new hardware. On the other hand, however, there may be an insufficient budget or resources to purchase and install all such hardware at one time.

In present practice, in order to work around this issue, an engineer may be forced to install some, but not all, of the new hardware. However, such practice breaks the one-to-one relationship between the hardware class and its instances and is, therefore, undesirable. For example, such a practice would require the new module instances to accommodate new hardware and would require different module classes for different hardware configurations, where the engineers are forced, in practice, to break class linkages in order to phase in the new module classes and related instances over time. Thus, similar hardware could have different classes creating a version control disconnect for similar hardware, devices, elements, etc. in the plant, therefore, making the overall configuration, maintenance, and maintainability of the plant less effective and potentially dangerous.

As an example, a process plant may be associated with a valve class, where the valve class may have over 100 instances corresponding to hardware valves located within the process plant. In the present example, the logic of the valve class may have to be changed to accommodate a new value, new feature, or new use case in the process plant. Because the valve class has over a 100 of valve instances, the implementation of the change to the instances must be synchronized with the installation of the new hardware (including, e.g., related cables) over time. In accordance with current practices, a change to the valve class would cause all of the respective valve instances to be immediately impacted, where the changes would cause new valve instances to be automatically downloaded to all valves associated with the given value class in the existing the online system. However, downloading new valve instances to old valve hardware can cause the old valve module's logic to function incorrectly, causing issues, malfunctions, and possibly dangerous conditions within the process plant.

In current practice, to work around this, engineers must first break the one-to-one mapping, which is the class linkage between valve class and its valve class instances, for any hardware running valve instances that the engineer does not want to be impacted before changing the class. As previously discussed, this is undesirable, especially in a validated plant because those unlinked instances are now free-standing and their logic may be changed arbitrarily. This creates a version control issue that can be difficult manage, track, and ultimately can be dangerous to the process plant. Moreover, this situation also creates more overhead for the control engineer to keep track of the unlinked instances and introduces confusion and errors.

In some cases, engineers can create a new, dummy module class, and link/un-link one instance at a time to the new, dummy module class to implement the desired changes over time. However, this second approach not only takes a long time, but also creates an administrative burden, and may also introduce confusion and errors, especially where multiple engineers are responsible for configuring and maintain the process plant.

SUMMARY

In order to overcome the aforementioned issues, module-based systems and methods are described herein for controlled roll-out of module classes for configuring a process plant. In various embodiments, the module-based system and methods may include one or more processors configured to generate a second version of a module class based on a modification to a first version of the module class. In some embodiments, the module class may be a derived module class, where the derived module class inherits the properties or functionality of a parent module class.

In some embodiments, the module class may be associated with one or more module instances, where the module instances may each be associated with a process control element of the process plant. A process control element may include a field device, or a portion of a field device, including, for example, a valve.

The second version of the module class may correspond to a changed process control element of the process plant, including, for example, a hardware change where one process control element is replaced with another process control element.

In some embodiments, the modification to the first version of the module class can include adding one or more inputs (e.g., feedback inputs) to the module class, where the one or more inputs may be accessed to facilitate at least partial control of the upgraded process control element.

In various embodiments, the module-based systems and methods are operable to execute a roll-out instruction. The roll-out instruction may include a routine for updating one or more upgraded process control elements, where the upgraded process control elements each become associated with a new module instance based on the second version of a module class. The roll-out instruction may also be implemented to ignore, for example, to skip, one or more non-upgraded process control elements, where the non-upgraded process control elements each remain associated with a previous module instance based on the first version of the module class. For example, the roll-out instruction may be implemented via a selective upgrade routine, where the selective upgrade routine associates the upgraded process control elements with the new module instances based on the second version of the module class. The selective upgrade routine could be implemented to simply ignore or skip the non-upgraded process control elements, such that the non-upgraded process control elements do not become associated with any second new module instance based on the second version of the module class.

In some embodiments, the roll-out instruction may be executed immediately. In other embodiments, the roll-out instruction may be executed at a scheduled time.

In additional embodiments, once the roll-out instruction has been executed, each of the upgraded process control elements and the non-upgraded process control elements may be used together to control at least a portion of the process plant. In such embodiments, the process plant would be at least partially controlled by different versions, for example, the first version and the second version, of the same module class, including at the same time.

The module-based systems and methods may be configured to track via a module configuration record one or more module instances. In some embodiments, the module configuration record can indicate a version of the module class for each of the one or more module instances. The module configuration record may also indicate that the module class has a phased roll-out state.

In some embodiments, the module-based systems and methods may be configured to prevent additional updating of the module class when the module configuration record indicates that the module class has a phased roll-out state.

In other embodiments, the upgraded process control elements may be included in an upgraded process control element set that defines each process control element to be associated with a new module instance of the second version of the module class. The upgraded process control element set can be created when the roll-out instruction executes. In certain embodiments the upgraded process control element set may be a subset of all process control elements of the process plant.

In some embodiments, selection of the process control elements to include in the upgraded process control element set may be received by the module-based systems and methods including, for example, via a graphical interface where an operator can select which process control elements to include in the upgraded process control element set.

For example, in some embodiments, selection of the upgraded process control element set may include selecting process control elements associated with a particular derived module class. In other embodiments, selection of the upgraded process control element set may include selecting process control elements associated with a particular hierarchy of the process plant. In still further embodiments, selection of the upgraded process control element set may include selecting process control elements associated with a physical area of the process plant.

In various embodiments, an additional roll-out instruction may be executed, where the additional roll-out instruction applies a configuration change to each of the new module instances based on the second version of the module class and also to the previous module instances based on the first version of the module class. The configuration change can includes an additional modification that is applied to each of the second version of a module class and to the first version of the module class, for example, to apply a patch or quick fix to the module class as a whole. For example, in one embodiment, the additional modification can add calculation functionality to each of the second version of a module class and the first version of the module class in order to enhance the functionality of the module class across both versions.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

The Figures depict preferred embodiments for purposes of illustration only. Alternative embodiments of the systems and methods illustrated herein may be employed without departing from the principles of the invention described herein.

DESCRIPTION OF THE PREFERRED EMBODIMENTS

Figure 1:
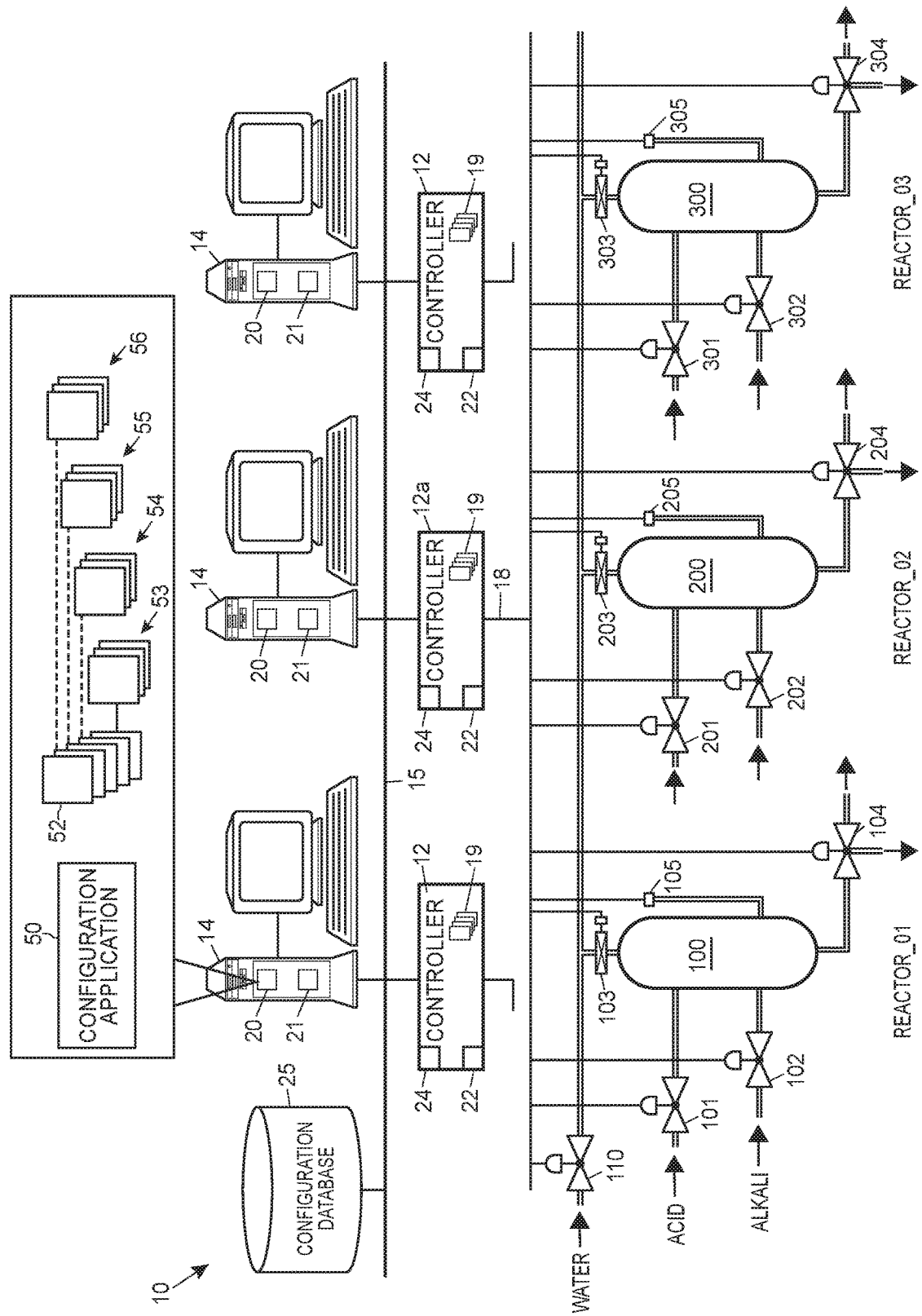
FIG. 1 is a block diagram of an embodiment of a distributed process control network located within a process plant, including an operator workstation that implements a configuration application for controlled roll-out of module classes for configuring the process plant.

FIG. 1 is a block diagram of an embodiment of a distributed process control network located within a process plant, including an operator workstation that implements a configuration application for controlled roll-out of module classes for configuring the process plant. In the embodiment of FIG. 1, a process plant 10 includes one or more process controllers 12 coupled to numerous workstations 14 via, for example, an Ethernet connection or bus 15. The controllers 12 are also coupled to devices or equipment within the process plant 10 via sets of communication lines or buses 18, with only the set of communication lines 18 connected to the controller 12a being illustrated in FIG. 1. The controllers 12, which may be implemented by way of example using the OVATION™ controller sold by Fisher-Rosemount Systems, Inc., are capable of communicating with process control elements, such as field devices and function blocks within field devices distributed throughout the process plant 10 to perform one or more process control routines 19 to thereby implement desired control of the process plant 10. The workstations 14 (which may be, for example, personal computers) may be used by one or more configuration engineers to design the process control routines 19 to be executed by the controllers 12 and display routines to be executed by the workstations 14 or other computers, and to communicate with the controllers 12 so as to download such process control routines 19 to the controllers 12 and 12a. Furthermore, the workstations 14 may execute display routines that receive and display information pertaining to the process plant 10 or elements thereof during operation of the process plant 10.

Each of the workstations 14 includes a memory 20 for storing applications, such as configuration design applications and display or viewing applications, and for storing data, such as configuration data pertaining to the configuration of the process plant 10. Each of the workstations 14 also includes a processor 21 that executes the applications to enable a configuration engineer to design process control routines and other routines and to download these process control routines to the controllers 12 or to other computers or to collect and display information to a user during operation of the process plant 10.

Still further, each of the controllers 12 includes a memory 22 that stores control and communication applications and a processor 24 that executes the control and communication applications in any known manner. In one case, each of the controllers 12 stores and executes a controller application that implements a control strategy using a number of different, independently executed, control modules or blocks 19. The control modules 19 may each be made up of what are commonly referred to as function blocks wherein each function block is a part or a subroutine of an overall control routine and operates in conjunction with other function blocks (via communications called links) to implement process control loops within the process plant 10.

As is well known, function blocks, which may be objects in an object oriented programming protocol, typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process plant 10. Of course hybrid and other types of complex function blocks exist such as model predictive controllers (MPCs), optimizers, etc. While the Fieldbus protocol and the OVATION™ system protocol use control modules and function blocks designed and implemented in an object oriented programming protocol, the control modules could be designed using any desired control programming scheme including, for example, sequential function block, ladder logic, etc. and are not limited to being designed using function block or any other particular programming technique or programming language.

The workstations 14 may provide a graphical depiction of the process control routines 19 within the controllers 12 to a user via a display screen illustrating the process control elements within the process control routines 19 and the manner in which these process control elements are configured to provide control of the process plant 10. In the system of FIG. 1, a configuration database 25 may be connected to the Ethernet bus 15 to store configuration data used by the controllers 12 and the workstations 14 as well as to serve as a data historian by collecting and storing data generated in the process plant 10 for future use.

In the process plant 10 illustrated in FIG. 1, the controller 12a is communicatively connected via the bus 18 to three sets of similarly configured reactors (which are replicated equipment within the process plant 10) referred to herein as Reactor_01, Reactor_02, and Reactor_03. Reactor_01 includes a reactor vessel or tank 100, three input valve systems (which are process control elements as equipment entities) 101, 102, and 103 connected so as to control fluid inlet lines providing acid, alkali, and water, respectively, into the reactor vessel 100 and an outlet valve system 104 connected so as to control fluid flow out of the reactor vessel 100. A sensor 105, which can be any desired type of sensor, such as a level sensor, a temperature sensor, a pressure sensor, etc., is disposed in or near the reactor vessel 100. Moreover, a shared header valve system 110 is connected on the water line upstream of each of the reactors Reactor_01, Reactor_02, and Reactor_03 to provide a master control for controlling the flow of water to each of those reactors.

Similarly, Reactor_02 includes a reactor vessel 200, three input valve systems 201, 202, and 203, an outlet valve system 204 and a level sensor 205, while Reactor_03 includes a reactor vessel 300, three input valve systems 301, 302, and 303, an outlet valve system 304 and a level sensor 305. In the example of FIG. 1, the reactors Reactor_01, Reactor_02, and Reactor_03 may produce salt with the input valve systems 101, 201, and 301 providing acid, the input valve systems 102, 202, and 302 providing alkali and the input valve systems 103, 203, and 303, in conjunction with the shared water header 110, providing water to the reactor vessel 100. The outlet valve systems 104, 204, and 304 may be operated to send product out of a flow line directed to the right in FIG. 1 and to drain waste or other unwanted material out of a flow line directed to the bottom in FIG. 1.

The controller 12a is communicatively coupled to the valve systems 101-104, 110, 201-204, and 301-304 and to the sensors 105, 205, and 305 via the bus 18 to control the operation of these process control elements to perform one or more operations with respect to the reactor units, Reactor_01, Reactor_02 and Reactor_03. Such operations, generally called phases, may include, for example, filling the reactor vessels 100, 200, 300, heating the material within the reactor vessels 100, 200, 300, dumping the reactor vessels 100, 200, 300, cleaning the reactor vessels 100, 200, 300, etc.

The valves, sensors and other process control elements illustrated in FIG. 1 may be any desired kinds or types of process control elements including, for example, Fieldbus devices, standard 4-20 Ma devices, HART devices, etc. and may communicate with the controller 12 using any known or desired communication protocol such as the Fieldbus protocol, the HART protocol, the 4-20 Ma analog protocol, etc. Still further, other types of devices may be connected to and be controlled by the controllers 12 in accordance with the principles discussed herein. Also, other numbers and types of controllers may be connected within the plant 10 to control other devices or areas associated with the process plant 10 and the operation of such additional controllers may be coordinated with the operation of the controller 12*a* illustrated in FIG. 1 in any desired manner.

Generally speaking, the process plant 10 of FIG. 1 may be used to implement batch processes in which, for example, one of the workstations 14 or the controller 12*a* executes a batch executive routine, which is a high level control routine that directs the operation of one or more of the reactor units (as well as other process control elements or other equipment) to perform a series of different steps (commonly referred to as phases) needed to produce a product, such as a particular type of salt. To implement different phases, the batch executive routine uses what is commonly referred to as a recipe which specifies the steps to be performed, the amounts and times associated with the steps and the order of the steps. Steps for one recipe might include, for example, filling a reactor vessel with the appropriate materials or ingredients, mixing the materials within the reactor vessel, heating the materials within the reactor vessel to a certain temperature for a certain amount of time, emptying the reactor vessel and then cleaning the reactor vessel to prepare for the next batch run. Each of the steps defines a phase of the batch run and the batch executive routine within the controller 12*a* may execute a different control algorithm for each one of these phases. Of course, the specific materials, amounts of materials, heating temperatures, times, etc. may be different for different recipes and, consequently, these parameters may change from batch run to batch run depending on the product being manufactured or produced and the recipe being used. Those skilled in the art will understand that, while control routines and configurations are described herein for batch runs in the reactors illustrated in FIG. 1, control routines may be used to control other desired devices to perform any other desired batch process runs or to perform continuous process runs, if so desired.

As will also be understood, the same phases or steps of a batch process can be implemented on each of the different reactor units of FIG. 1 at the same or at different times. Furthermore, because the reactor units of FIG. 1 generally include the same number of and types of equipment, the same generic phase control routine for a particular phase may be used to control each of the different reactor units, except that this generic phase control routine has to be modified to control the different hardware, equipment, or otherwise process control elements associated with the different reactor units. For example, to implement a fill phase for Reactor_01 (wherein the reactor unit is filled), a fill control routine will open one or more valves, which are process control elements, associated with the input valve systems 101, 102, and 103 for a certain amount of time, for example, until the level meter 105 senses that the vessel 100 is full. However, this same control routine may be used to implement a fill phase for Reactor_02 by merely changing the designation of the input valve(s) to be those associated with the valve systems 201, 202, and 203 instead of the valve systems 101, 102, and 103 and by changing the designation of the level meter to be the level meter 205 instead of the level meter 105.

To make the creation and changing of a process configuration easier and less time consuming, one module control technique that has been developed includes a configuration application 50 stored in one of the workstations 14 of FIG. 1 that includes a set of module class objects 52 (i.e., module classes) for use in configuring the process control plant 10. One example of this technique is described in U.S. Pat. No. 7,043,311, entitled, "Module Class Objects in a Process Plant Configuration System," the entire disclosure of which is hereby expressly incorporated by reference herein. In particular U.S. Pat. No. 7,043,311 describes that the module class objects are used when configuring a plant with numerous sets of replicated equipment. Generally speaking, a different module class object 52 can be created for each different type of physical unit or equipment that is replicated or used within the process plant 10, for each type of control activity that is replicated or used within the process plant 10, for each different type of display application that is replicated or used in the process plant 10, etc. Once created, the module class objects 52 can be used to configure process control elements of the process plant 10 that correspond to module class objects.

The module class objects 52 (referred to herein as module class objects or module classes), which are essentially generic versions of process entities and are not tied to any particular process entity, can have lower-level objects or instances 53, 54, 55, and 56 (referred to herein as module objects, module blocks, or module instances) associated therewith. Each module instance is created from and is based on a module class, and inherits the same structure and properties as the module class from which it was created. Each module object may be tied to a particular entity within the process plant 10. Thus, a single module class 52 may be created to represent a particular type of reactor unit (no matter how many of those reactor units are present within the plant 10), while a different module instance 53 may exist or be created for each of the different reactor units of that type actually present within the plant 10.

In existing implementations, for example, as described by U.S. Pat. No. 7,043,311, the module objects created from a module class are associated with and owned by the module class. As a result, any changes made to the module class are automatically reflected in or propagated to each of the module instances associated with that module class. Therefore, when a number of module instances have been created from a particular module class, with each of the different module instances tied to different process entities, each of the different module instances can be changed simply changing the related module class and having the changes automatically propagated down to the associated module instances.

Basically, each module class is a configuration container including a generic definition of a process entity in the form of all of the different control and/or display applications or routines that are applicable to that entity to be used by the controllers 12 to control that entity or by the workstations 14 to perform display activities with respect to that entity. The module class may represent a process entity of any nature, such as a unit, a piece of equipment, a control entity, a display application, etc. During the configuration of the process plant 10, the module class may be used to create configuration instances of the process entity for any number of different process entities that conform to the definition provided by the module class object, with each configuration instance (the module object created from the module class object) being associated with or tied to a different actual process entity. These different module instances include, among other things, control routines and/or display routines bound to particular process entities as disposed within the process plant 10, with these control routines being able to be downloaded and used within the controllers 12 of FIG. 1 to perform actual control activities on the process entities and with the display routines being able to be downloaded to workstations 14 to perform actual display activities with respect to the entities during operation of the process plant 10.

As described herein, different types of module class objects may reflect process entities of different scopes and, therefore, contain control and/or display routines configured to operate on or with respect to process entities of different scope. The larger the scope of the process entity, such as a unit, the more control and/or display routines will typically be associated with the module class and the easier it is to configure sections of the plant using those module classes. However, the larger the scope of the process entity associated with a module class, the less likely that the process will include replicated equipment at that scope and, thus, the less likely the module class is to be useful on a large scale. Conversely, the lower the scope of the process entity associated with a module class, the more likely the module class is able to be used in various different locations of the plant, but the less amount of configuration is performed when using that module class in any particular instance.

Figure 2:
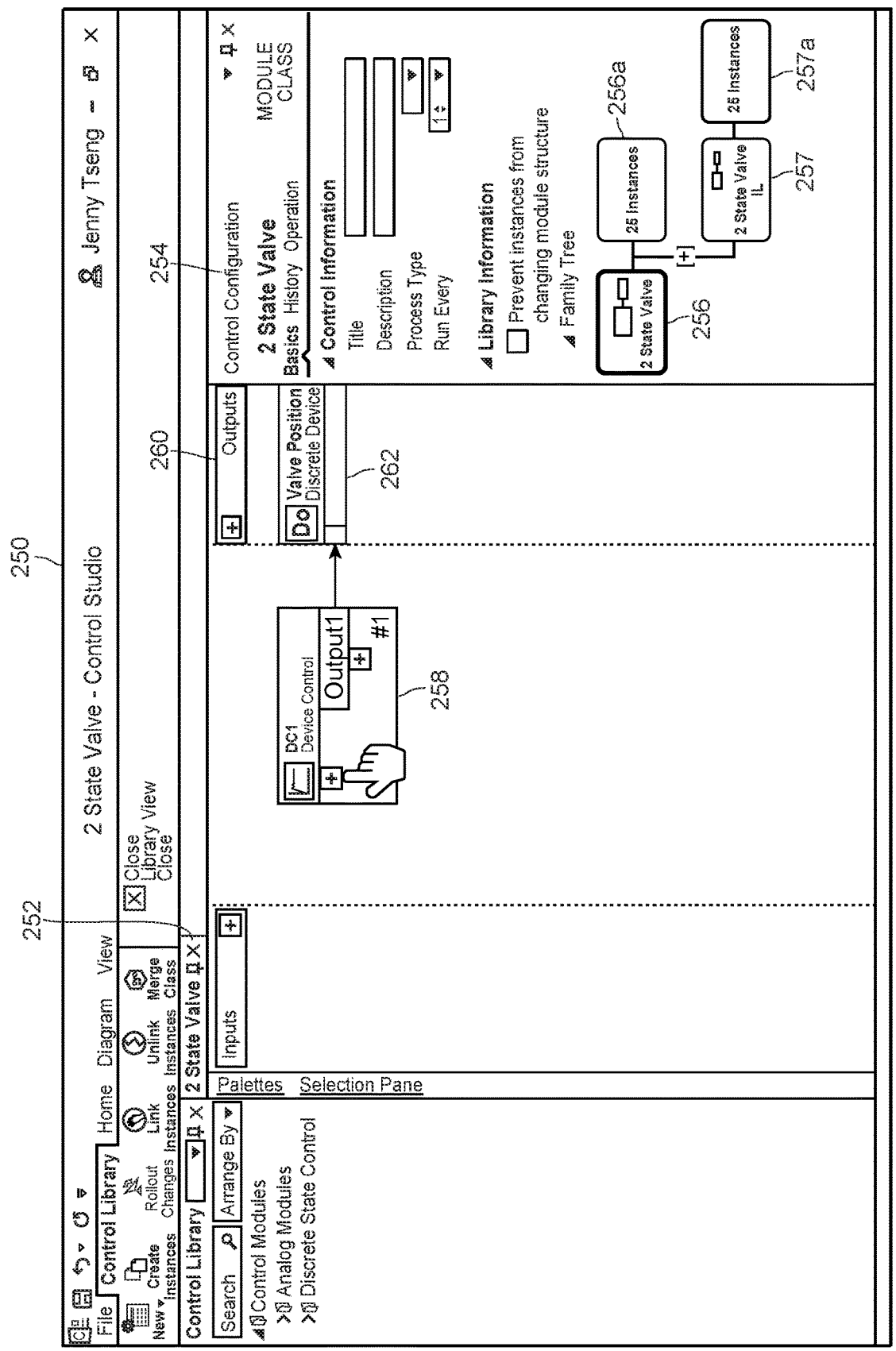
FIG. 2 is a depiction of an embodiment of a first configuration screen which may be used to modify a first version of a module class in accordance with various embodiments herein.

FIG. 2 is a depiction of an embodiment of a first configuration screen which may be used to modify a first version of a module class. The configuration screen may be part of a configuration application, such as configuration application 50 executing on one of the workstations 14 of FIG. 1. For example, as illustrated by FIG. 2, the configuration screen 250 is part of a control studio configuration application. General details of the control studio configuration application are described in U.S. Pat. No. 7,043,311.

The configuration screen 250 of FIG. 2 illustrates the configuration of a particular field device module class, for example, a 2-State Valve module class 256 as depicted in 2-State Valve window 252. Specifically, configuration screen 250 depicts a graphical representation of the 2-State Valve module class 256. The 2-State Valve module class 256 includes a control portion comprising the DC1 Device Control 258. The DC1 Control 258 may include logic, routines, or functions for controlling a physical 2-State Valve device operating within process plant 10. The logic, routines, or functions of the 2-State Valve module class 256 may be implemented in a variety of different computer languages including, for example, C, C++, Java, or any other computer language for implementing drivers, BIOS software, or other software for controlling the 2-State Valve device associated with the 2-State Valve module class 256. In some embodiments, the logic, routines, or functions may be executed on a device controlling the 2-State Valve, including, for example, any of the controllers 12 or 12a of FIG. 1.

Figure 3:
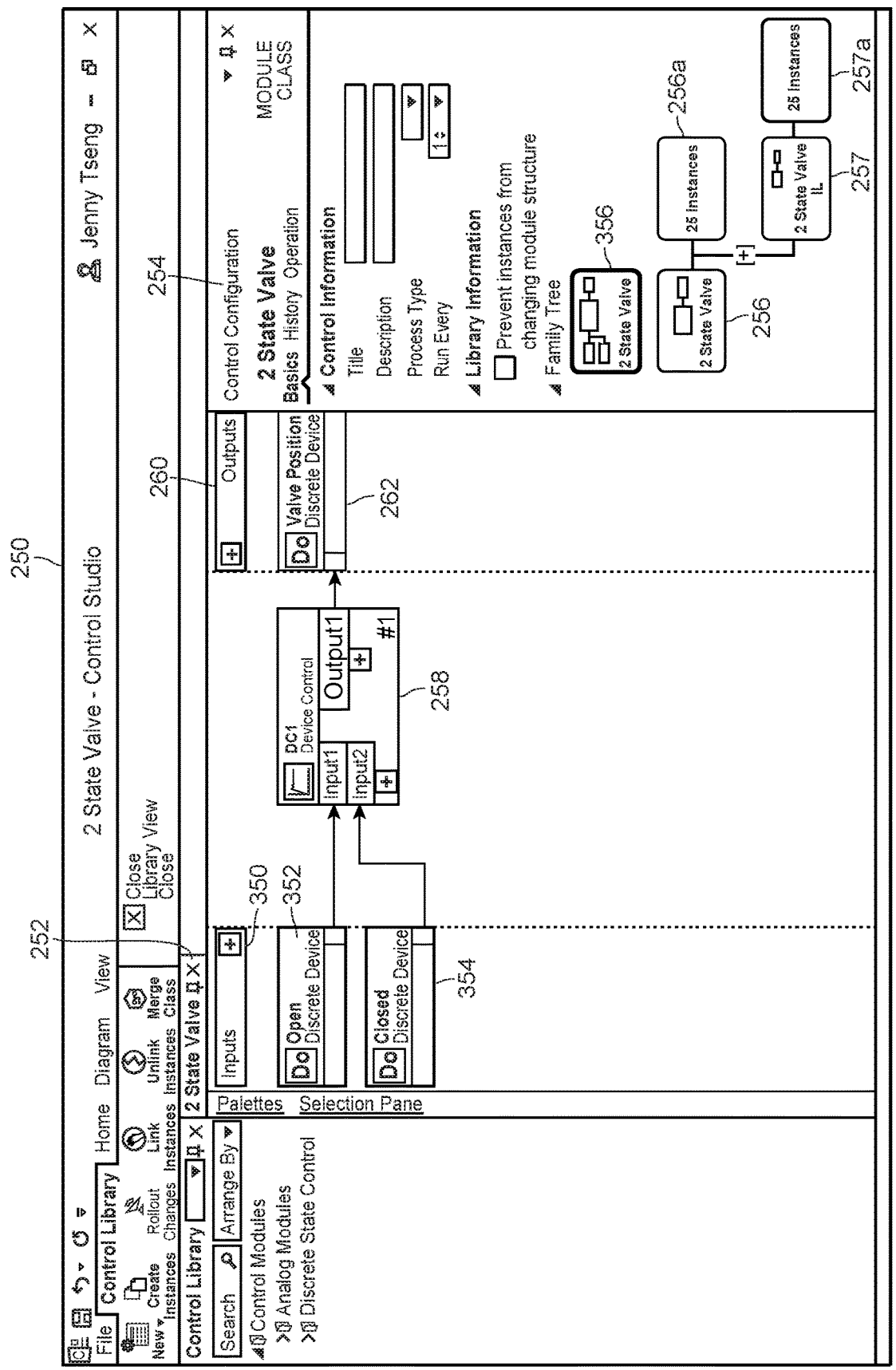
FIG. 3 is a depiction of an embodiment of the configuration screen of FIG. 2 showing a second version of the module class from FIG. 2.

A module class may have one or more outputs 260, where information either computed by, or stored in, an instance of the module class may be determined and/or output from the instance for use in configuring or otherwise controlling the process plant 10. In the embodiment of FIG. 3, for example, the DC1 Device Control 258 of 2-State Valve module class 256 includes a valve position output 262, which can include an output number or other value that indicates the current or desired open/close position of that the valve in operation.

Information for the 2-State Valve module class 256 is displayed within the control configuration window 254. For example, control configuration window 254 includes information for the 2-State Valve module class 256 including input fields for defining a title, description, and process type for the 2-State Valve module class 256. For example, the title of the class could have been designated to "2-State Valve" in a prior configuration session. In addition, the control configuration window 254 allows an execution runtime to be specified, where, for the current example embodiment, instances of the 2-State Valve module class 256 are set to run every 2 seconds.

The control configuration window 254 also includes library information, which includes a family tree of 2-State Valve module instances shown with their respective module classes. For example, in the current embodiment, 25 2-State Valve module instances 256a are associated with and based on the 2-State Valve module class 256. The 25 2-State Valve module instances 256a are live instances executing in computer memory that are instantiated from, and are therefore based on, the related 2-State Valve module class 256. The family tree of control configuration window 254 also shows the 2-State Valve IL module class 257, which is a derived class of the 2-State Valve module class 256. For example, derived class 2-State Valve IL module class 257 may have additional properties or functionality when compared with its parent 2-State Valve module class 256. As shown in current embodiment of FIG. 2, 25 2-State Valve IL module instances 257a are also associated with the derived 2-State Valve IL module class 257. Accordingly, the configuration window 254 depicts the 2-State Valve module class 256 with 25 instances, which has a derived class (i.e., 2-State Valve IL) with another 25 instances, where the 2-State Valve module class 256 and the 2-State Valve IL module class 257 are said to be in the same family.

In the embodiment of FIG. 2, each of module classes 256, 256a, 257, and 257a currently include only a single, or first, version, although additional further versions may be generated as further described herein.

FIG. 3 is a depiction of an embodiment of the configuration screen of FIG. 2 showing a second new version of the 2-State Valve module class 256 from FIG. 2. As disclosed in various embodiments herein, one or more processors, such as the configuration application 50 executing on one of the workstations 14 of FIG. 1, may be configured to generate a second version of a module class based on a modification to a first version of the module class. In the embodiment of FIG. 3, a second version of the 2-State Valve module class 256 from FIG. 2 is generated based on a modification to original, or first, version of the 2-State Valve module class 256. For example, control configuration window 254 includes a second version of the 2-State Valve module class 256 from FIG. 2. The second version is also included under the family tree and is shown as new 2-State Valve module class 356.

The second version of the 2-State Valve module class 356 may correspond to a changed process control element of the process plant, including, for example, a hardware change where one process control element is replaced with another process control element. In one embodiment, for example, an engineer can update the first version module class (e.g., 2-State Valve module class 256) with a new module class (e.g., 2-State Valve module class 356) to correspond to the changed hardware. The engineer can then roll-out the updated 2-State Valve module class 356 to a new hardware (e.g., a valve) as described herein, which may including testing the new valve. After the engineer is satisfied with the changes, the engineer can indicate that the remainder of the similar valves are to receive the updated module class 2-State Valve module class 356.

In some embodiments, for example, the modification to the first version of the module class can include adding one or more inputs (e.g., feedback inputs) to the first version of the module class, where the one or more inputs may be accessed, for example, by configuration application 50 executing on one of the workstations 14 of FIG. 1, to facilitate at least partial control of the upgraded process control element. For example, the configuration screen 250 of FIG. 3 illustrates adding two inputs to the 2-State Valve module class 256 to generate the new 2-State Valve module class 356. Using the configuration screen 250, one or more inputs 350 may be added via the 2-State Valve widow 252. Specifically, in the embodiment of FIG. 3, the 2-State Valve module class 256 is modified to add an open position feedback input 352 and closed position feedback input 354 to generate the 2-State Valve module class 356.

In some embodiments, the logic or functionality of the DC1 Device Control 258 may also be changed in order to use input values of the newly added open position feedback input 352 and closed position feedback input 354. For example, at least in one embodiment, the open position feedback input 352 and closed position feedback input 354 values are fed into the logic or functions of the DC1 Device Control 258 during operation of a 2-State Valve running an instance based on the 2-State Valve module class 356, where the inputs 352 and 354 are used to refine or implement more precise control over the valve position output value 262 in order to enhance or optimize operation of the physical 2-State Valve device operating within the process plant 10.

Figure 4:
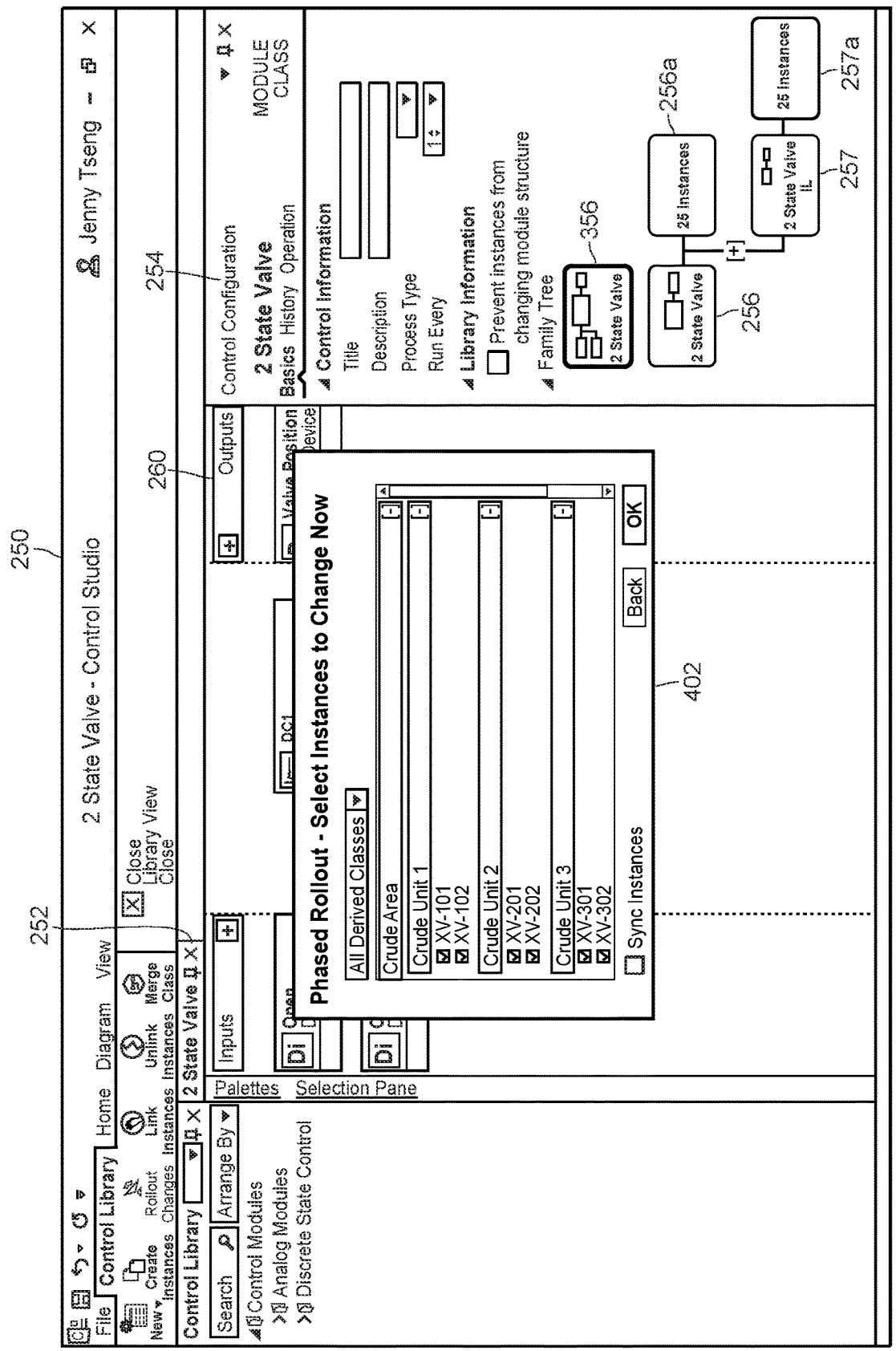
FIG. 4 is a depiction of an embodiment of the configuration screen of FIG. 3 showing process control elements selected to be associated with new module instances of the second version of the module class from FIG. 3.

FIG. 4 is a depiction of an embodiment of the configuration screen of FIG. 3 showing process control elements selected to be associated with new module instances of the second version 2-State Valve module class 356 from FIG. 3. In the embodiment of FIG. 4, selection of the process control elements include the selected process control elements to include in an upgraded process control element set. As depicted in FIG. 4, the selected process elements for inclusion in the upgraded process control element set may be received via a graphical interface where an operator, such as an engineer, can select which process control elements to include in the upgraded process control element set for purposes of upgrading those process control elements with new instances based on the second version 2-State Valve module class 356.

For example, as shown in FIG. 4, an upgraded process control element set dialog box 402 is displayed to the operator for receiving the selections to include within the process control element set. In the embodiment of FIG. 4, the process control elements to be upgraded are included in an upgraded process control element set that defines each process control element to be associated with a new module instance of the second version of the module class (e.g., 2-State Valve module class 356).

In some embodiments, the selections may relate to a particular area of the process plant 10. For example, in FIG. 4, the selection relate to the "Crude Area" of the process plant 10. The operator may select various 2-State Valve instances currently executing in the Crude Area, including those instances running in Crude Unit 1 (e.g., model instances corresponding to 2-State Valve devices titled "XV-101" and "XV-102"), Crude Unit 2 (e.g., model instances corresponding to 2-State Valve devices titled "XV-201" and "XV-202"), and Crude Unit 3 (e.g., model instances corresponding to 2-State Valve devices titled "XV-301" and "XV-302"). In the current embodiment, each of Crude Unit 1, Crude Unit 2, and Crude Unit 3 areas may represent different subareas or logic areas of the plant such that the Crude Units 1-3 subareas or logical areas form a hierarchy with respect the larger Crude Area where the Crude Units 1-3 reside within the Crude Area and the specific instances (e.g., corresponding to 2-State Valves XV-101, XV-102, XV-201, etc.) reside within the Crude Units 1-3 subareas or logic areas. Accordingly, in some embodiments, selection of the upgraded process control element set may include selecting process control elements associated with a physical area of the process plant.

In FIG. 4, all of the 2-State Valve instances associated with each of the Crude Units 1-3 subareas or logic areas are shown selected and, thus, in the present embodiment each of the 2-State Valve instances are selected to be associated with new module instances of the second version 2-State Valve module class 356. Accordingly, in some embodiments, selection of the upgraded process control element set may include selecting process control elements associated with a particular hierarchy of the process plant.

In various embodiments, the new module instances of the selected process control elements included in the process control element set can be instantiated when the roll-out instruction executes. The upgraded process control element set may be a subset of all process control elements of the process plant, for example, where some, but not all, of the process control elements of the process plant are included in the process control element set for modification.

Figure 5:
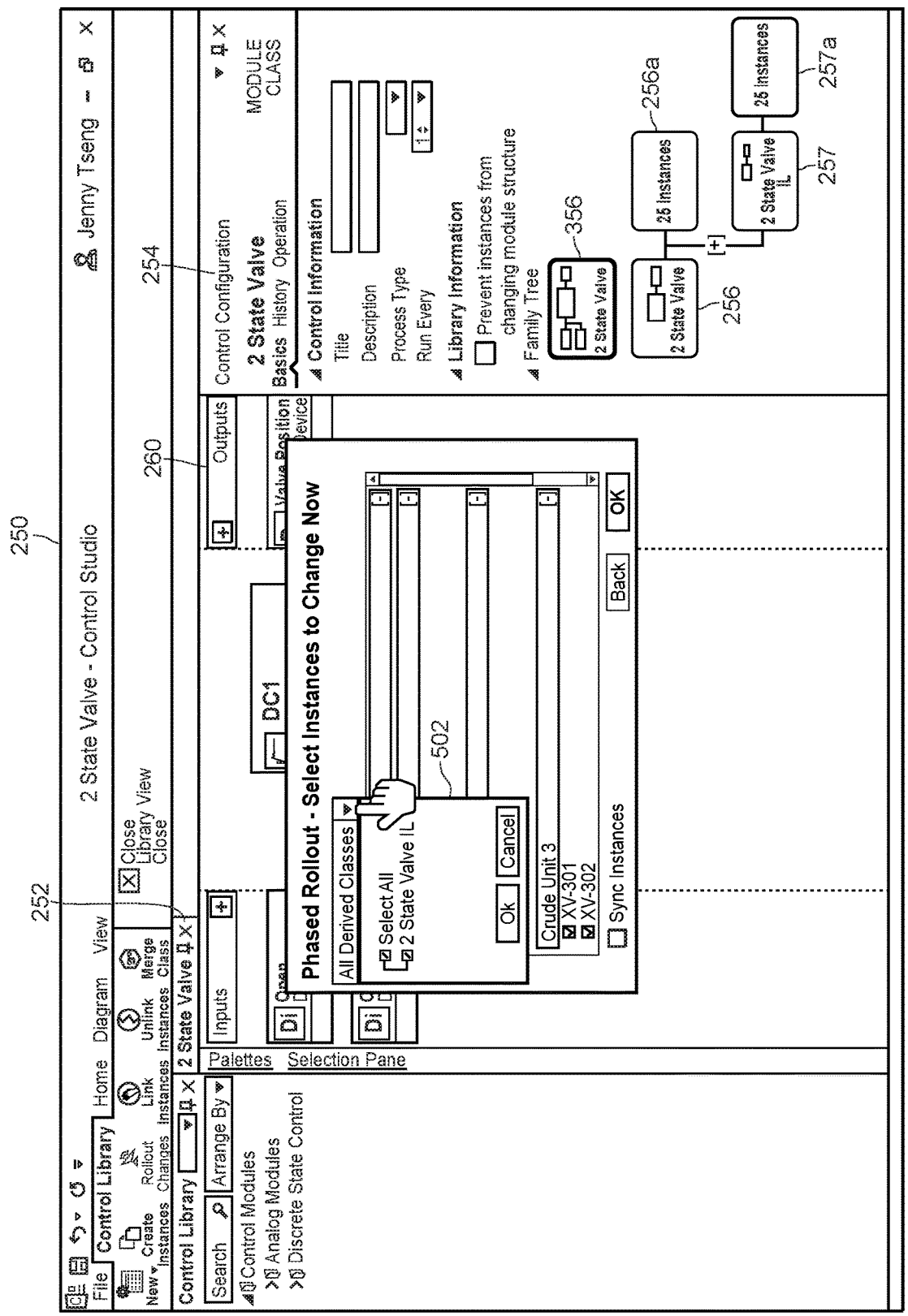
FIG. 5 is a depiction of an embodiment of the configuration screen of FIG. 3 showing process control elements selected based on a particular derived class, the selected process control elements to be associated with new module instances of the second version of the module class from FIG. 3.

FIG. 5 is a depiction of an embodiment of the configuration screen of FIG. 3 showing process control elements selected based on a particular derived class. In the embodiment of FIG. 5, the selected process control elements are to be associated with new instances based on the second version 2-State Valve module class 356. As depicted for FIG. 5, an operator can select the 2-State Valve IL module class 257 from a filter screen 502, which is a particular derived class derived from 2-State Valve module class 256. In some embodiments, the selection of the process control elements may cause the process control elements to be included in a process control element set as described for FIG. 4 herein. In such an embodiment, the process control element set would include process control elements associated with the particular derived module class, where a roll-out instruction would execute to update those instances based on the 2-State Valve IL module class 257, for example, all 25 module instances 257*a*.

Figure 6:
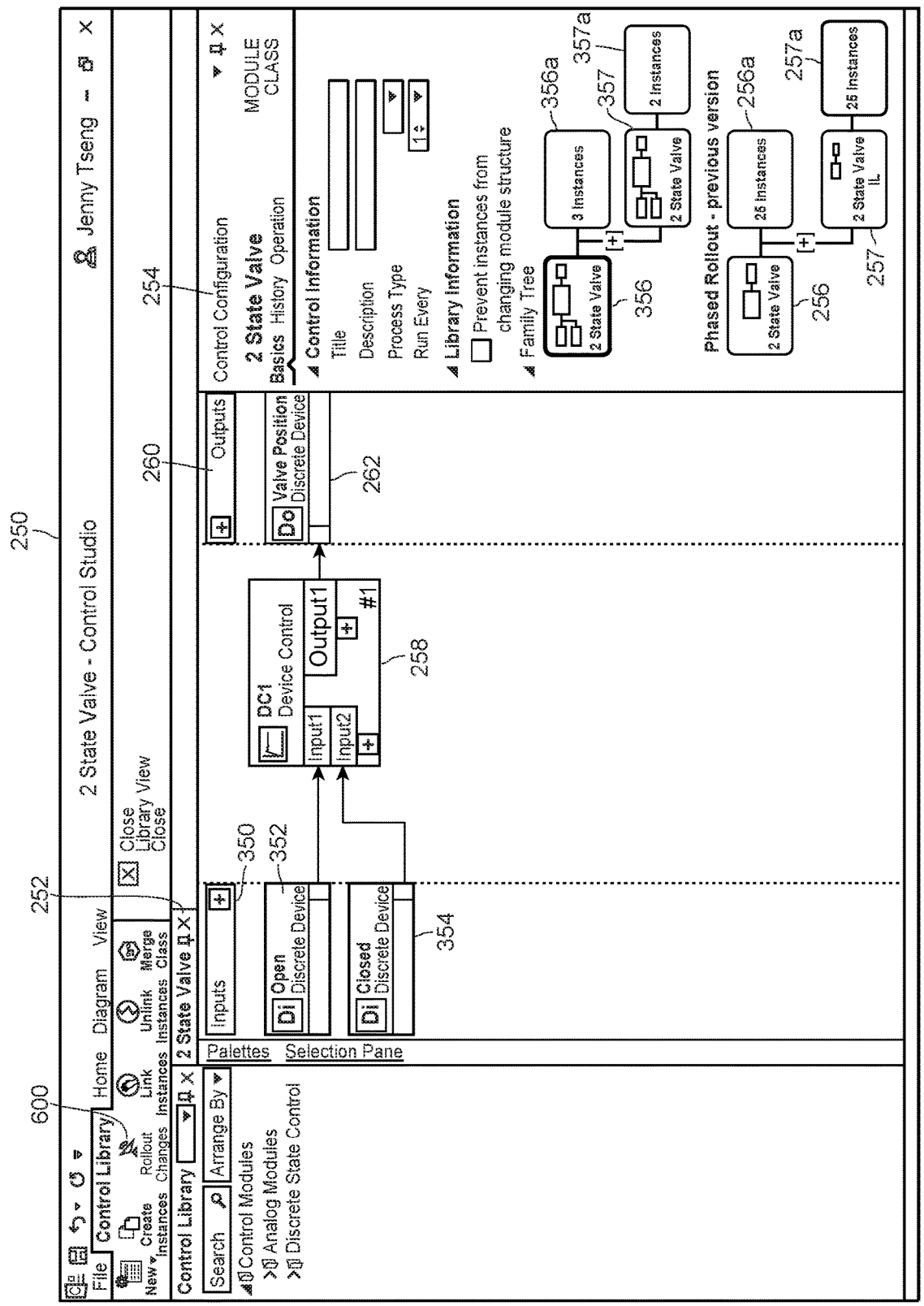
FIG. 6 is a depiction of an embodiment of the configuration screen of FIG. 3 showing the new module instances of the second version of the module class from FIG. 3 rolled-out to the process control elements in the process plant.

FIG. 6 is a depiction of an embodiment of the configuration screen of FIG. 3 showing new module instances of the 2-State Valve module class 356 as rolled-out to the process control elements in the process plant 10. In the embodiment of FIG. 6, the process control elements that are updated via the roll-out receive the new functionality, including new enhanced or optimized features provided by the 2-State Valve module class 356 as described herein. Accordingly, after execution of the roll-out, the 2-State Valve module class 356 may be associated with one or more new module instances instantiated and based on the 2-State Valve module class 356. Each of the new module instances may each be associated with a process control element of the process plant, such as a field device, or a portion of a field device, including, for example, a valve, or specifically, in the present embodiment a 2-State Valve device.

Benefits of using the roll-out functionality as described herein, include that a modification to a module class, such as 2-State Valve module class 256, does not automatically propagate to its related instances. Instead, a control engineer may modify a module class, such as 2-State Valve module class 256, to generate new 2-State Valve module class 356. Importantly, only when a set of valves are ready for the update, as specified, for example, by the engineer or some other process, such as an automated process, can a rollout be executed to change those valves designated for update. This allows the process plant 10 to be upgraded in phases, which may provide a more economical and less resource intensive approach to configuring, managing, and/or controlling the operation of the process plant 10. This also allows the engineer to test the new module class, and its related instances, over and over, without any worry of non-designated instances being impacted or inadvertently updated.

The control configuration window 254 of FIG. 6 shows new module instances based on the new 2-State Valve module class 356 that were generated as a result of execution of the roll-out. Specifically, the 2-State Valve module class 356 has three new module instances 356a based on the 2-State Valve module class 356. The three new module instances 356a may correspond to three device valves operating within the process plant that receive the enhanced functionality defined by the new the 2-State Valve module class 356. In addition, a derived module class (i.e., the 2-State Valve IL module class 357) is also depicted, where 2-State Valve IL module class 357 is an additional module class derived from the 2-State Valve module class 356, and that may include additional functionality or information about the valves that execute the module instances, for example, the 2 module instances 357a, based on the 2-State Valve IL module class 357. The additional functionality or information can include, for example, the position of the valve within the process plant, the date that the valve was placed into operation within the process plant, or other information or functionality related to the valve. Accordingly, as shown in the embodiment of FIG. 6, after execution of the roll-out, the process plant has at least two versions of module classes (e.g., the 2-State Valve module class 256 and the 2-State Valve module class 356) and related instances running in the process plant 10 for purposes of configuration and control of the process plant 10 as described herein.

In various embodiments, new module instances, such as module instances 356a and 357a, may be rolled-out via a roll-out instruction executed by one or more processors of the process plant including, for example, configuration application 50 executing on one or more of the processors of workstations 14 of FIG. 1. The roll-out instruction may include a routine for updating one or more upgraded process control elements, where the upgraded process control elements each become associated with a new module instance based on the second version of the module class, such as 2-State Valve module class 356 or 2-State Valve IL module class 357.

The roll-out instruction may also be implemented to ignore, for example, to skip, one or more non-upgraded process control elements, where the non-upgraded process control elements each remain associated with a previous module instance based on the first version of the module class, such as 2-State Valve module class 256 or 2-State Valve IL module class 257.

In one embodiment, an engineer may modify the 2-State Valve module class 256 to include the updates as described herein for the 2-State Valve module class 356, and then save the updates with the configuration application 50. The engineer may then instruct the system how to roll-out the updates. For example, the roll-out instruction may be implemented via a selective upgrade routine, where the selective upgrade routine associates the upgraded process control elements with the new module instances based on the second version of the module class. The routine may be selected from the configuration screen 250, for example, the roll-out changes selection 600, which may cause the configuration application 50 to execute the roll-out instruction to update the identified the upgraded process control elements.

In some embodiments, the selective upgrade routine may be implemented to simply ignore or skip the non-upgraded process control elements, such that the non-upgraded process control elements do not become associated with any second new module instance based on the second version of the module class, such as 2-State Valve module class 356 or 2-State Valve IL module class 357.

In some embodiments, the roll-out instruction may be executed immediately upon selection. In other embodiments, the roll-out instruction may be executed at a scheduled time. For example, an engineer may schedule subsequent roll-outs to one set of valves at a first time and to other subsets of valves at other times (e.g., via opportunistic roll-outs of module class changes). Other use cases may implement scheduling roll-outs as phased roll-outs based on training and/or availability of operators, such as based on operator shifts or work schedules.

In some embodiments, once the roll-out instruction has been executed, each of the upgraded process control elements and the non-upgraded process control elements may be downloaded to the controllers 12 or 12a and used together to control at least a portion of the process plant. In such embodiments, the process plant would be controlled by different versions, for example, the first version and the second version, of the same module class (e.g., 2-State Valve module class 256 and 2-State Valve module class 356), including at the same time.

In still further embodiments, a module configuration record may be configured to track, for example, via the configuration application 50, the module instances, such as module instances 256a, 257a, 356a, and/or 357a, that are currently running in the process plant. In some embodiments, the module configuration record can indicate a version of the module class for each of the module instances. The module configuration record may also indicate that the module class has a phased roll-out state. For example, from a system point of view, in some embodiments, when an engineer saves updates to a module class, the roll-out of the updated module class becomes a manual step instead of an automatic step. In such an embodiment, the module class to be rolled-out is flagged as being in a phased roll-out stage, and will have two live versions of the same module class, for example, a version of module instances based on the previous 2-State Valve module class 256 and a version of the module instances based on the new 2-State Valve module class 356.

Figure 7:
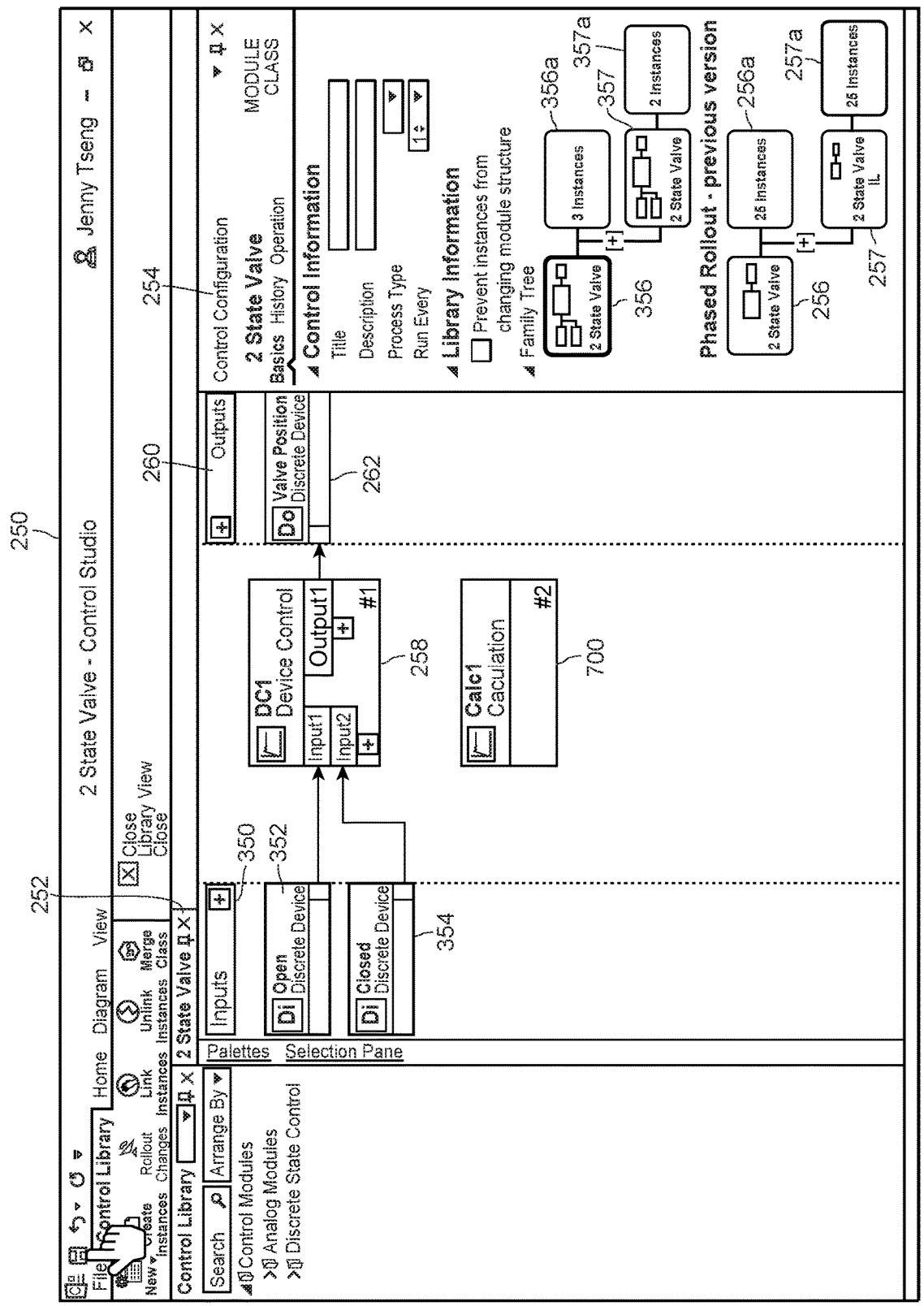
FIG. 7 is a depiction of an embodiment of the configuration screen of FIG. 3 showing an additional roll-out instruction applying a configuration change to the new module instance based on the second version of the module class and to the previous module instance based on the first version of the module class.

FIG. 7 is a depiction of an embodiment of the configuration screen of FIG. 3 showing an additional roll-out instruction that applies a configuration change to a new module instance based on the second version of the module class (e.g., 2-State Valve module class 256) and to a previous module instance based on the first version of the module class (e.g., 2-State Valve module class 356). For example, the embodiment of FIG. 7 may be used to perform a quick fix across multiple versions of a module class (e.g., across both versions of the 2-State Valve module class), where each version of the module class receives the configuration change implementing the quick fix.

Specifically, in various embodiments, an additional roll-out instruction may be executed by one or more processors, such as one or more of the processors of workstations 14 of FIG. 1. The additional roll-out instruction may apply a configuration change to each of the new module instances based on the second version of the module class (e.g., module instances 356a and/or 357a) and also to the previous module instances based on the first version of the module class (e.g., module instances 256a and/or 257a). The configuration change can include an additional modification that is applied to each of the second version of a module class (e.g., 2-State Valve module class 356) and the first version of the module class (e.g., 2-State Valve module class 256), for example, to apply a patch or quick fix to the module class as a whole. For example, in one embodiment the fix may be applied to the running instances. In other embodiments, the module classes may be updated and new instances instantiated that take the place of the existing module instances, e.g., module instances 356a and/or 357a and/or module instances 256a and/or 257a.

In the embodiment of FIG. 7, the additional modification includes adding a calculation functionality 700 to both the second version of a module class (2-State Valve module class 356) and the first version of the module class (2-State Valve module class 256) in order to enhance the module class, and their related instances, and, and therefore valves, across both versions.

Figure 8:
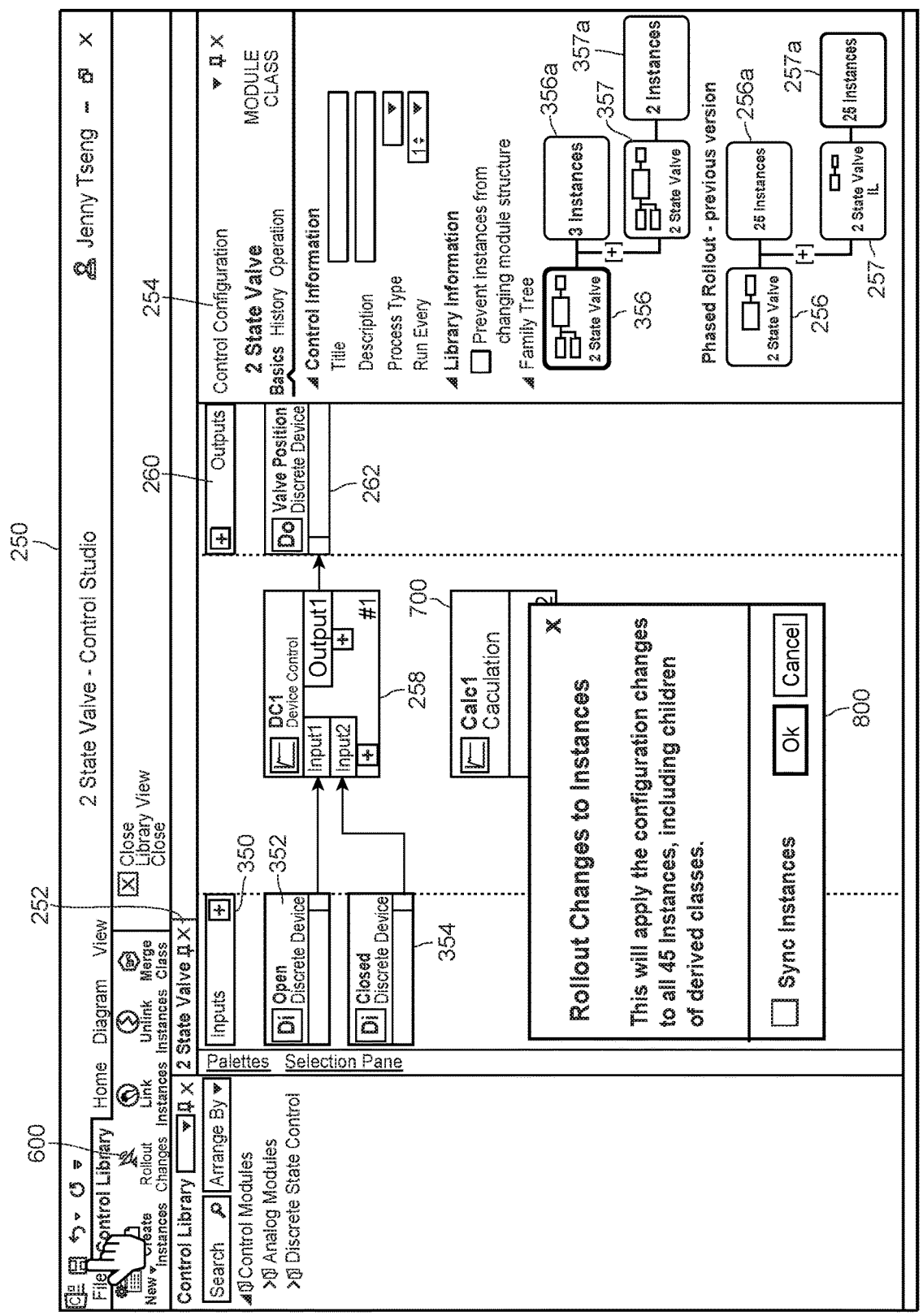
FIG. 8 is a depiction of an embodiment of the configuration screen of FIG. 7 showing a roll-out confirmation screen for executing the additional roll-out instruction.

FIG. 8 is a depiction of an embodiment of the configuration screen of FIG. 7 showing a roll-out confirmation screen 800 for executing the additional roll-out instruction. For example, the roll-out confirmation screen 800 may be launched after an engineer selects the rollout changes selection 600, where the roll-out confirmation screen 800 confirms whether the engineer wants to roll-out the quick fix changes to the module instances as described for FIG. 7.

Figure 9:
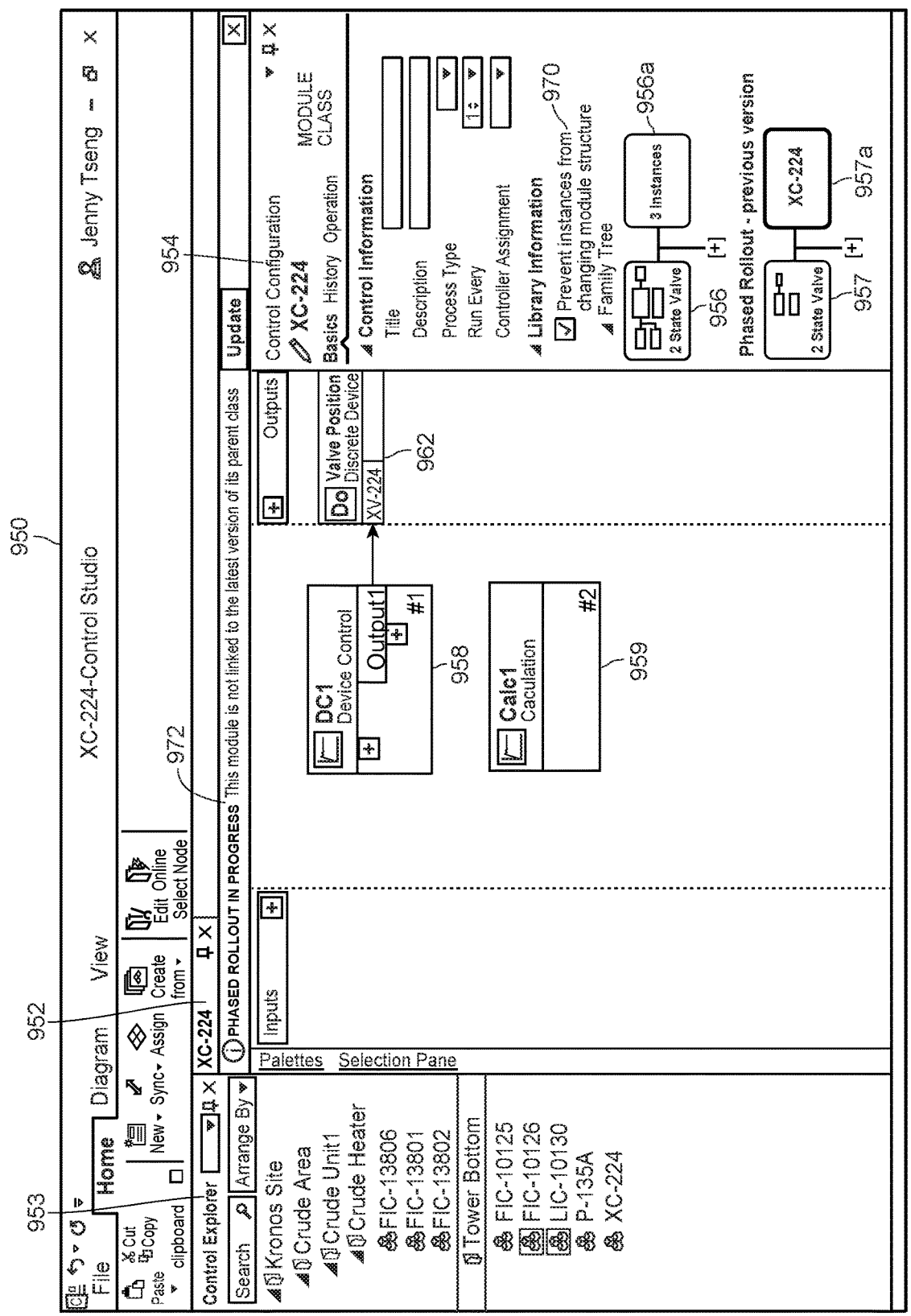
FIG. 9 is a depiction of an embodiment of the configuration screen showing module instances associated with a particular type of process control element of the process plant.

FIG. 9 is a depiction of an embodiment of the configuration screen showing module instances associated with a particular type of process control element of the process plant 10. In the embodiment of FIG. 9, the particular type of process control element is the XC-224 field device, which is a type of valve. FIG. 9 depicts the state of a phased roll-out from the point of view of the XC-224 device. The phased-roll out is indicated on the XC-224 device display view on the bottom right hand side and in the window heading 972 of the XC-224 device window 952.

The XC-224 device is identified in the control configuration window 954. The XC-224 device is also identified in a hierarchal fashion in the control explorer window 953. Specifically, control explorer window 953 arranges various process control elements, including the XC-224 device in a hierarchal fashion according to a process control element's physical location or area within the process plant. For example, as shown by the control explorer window 953, the XC-224 device is located at the bottom tower of a crude heater element, where the crude heater element is located in, or is part of, a crude unit 1 location, area, or logical area, and the crude unit 1 is further part of a larger crude area located at a site named Kronos within the process plant 10.

The configuration window 954 displays control information and options for the XC-224 device, including options to modify the title, description, process type, controller assignment, and run time of the XC-224 device.

The configuration window 954 also displays the module instances instantiated based off of the related XC-224 module class. In the embodiment of FIG. 9, there are two versions of the XC-224 module class (module classes 956 and 957), which are similar to the two versions of the 2-State Valve module class (i.e., 2-State Valve module class 256 and 2-State Valve module class 356) as described herein. Accordingly, the disclosure for the 2-State Valve module class applies equally herein with respect to the XC-224 module class. For example configuration screen 950 corresponds to configuration screen 250 as described herein, where configuration screen 950 relates specifically to the XC-224 module class. As an additional example, as depicted by the XC-224 device window 952, the XC-224 module class includes a DC1 Device Control 958 that corresponds to the DC1 Device Control 258 of the 2-State Valve module class 256 and the 2-State Valve module class 356 described herein. Moreover, the XC-224 module class includes a valve position output 962 that corresponds to the valve position output 262 of the 2-State Valve module class 256 and the 2-State Valve module class 356 described herein. Similarly, the XC-224 module class includes calculation functionality 959 corresponding to calculation functionality 700 for 2-State Valve module class 356 as described herein.

The XC-224 module class 956 represents an earlier, first version, of the XC-224 module class. The XC-224 module class 956 is associated with one or more module instances 956a corresponding to XC-224 devices currently running in the process plant. Similarly, the XC-224 module class 957 is a modified, second version, of the XC-224 module class. The XC-224 module class 957 is associated with three module instances 957a, which each may correspond to newly installed XC-224 devices, currently running in the process plant 10.

In some embodiments, the configuration application 50, and/or controllers 12, may be configured to prevent additional updating of a module class when a module configuration record indicates that the module class has a phased roll-out state. For example, the configuration record may include the information depicted by window heading 972, such that a "Phased Rollout Is In Progress," to indicate that updating is not currently allowed. In some embodiments, the option to prevent updating a module class may be a selectable option, for example, as shown in FIG. 9 where an engineer can select selectable option 970 to prevent instances from changing module structure. Accordingly, selectable option 970 can be used to prevent instances from changing module structure when a module class is in the middle of a phased roll-out so as to control the timing of and/or limit changes to the class.

Figure 10:
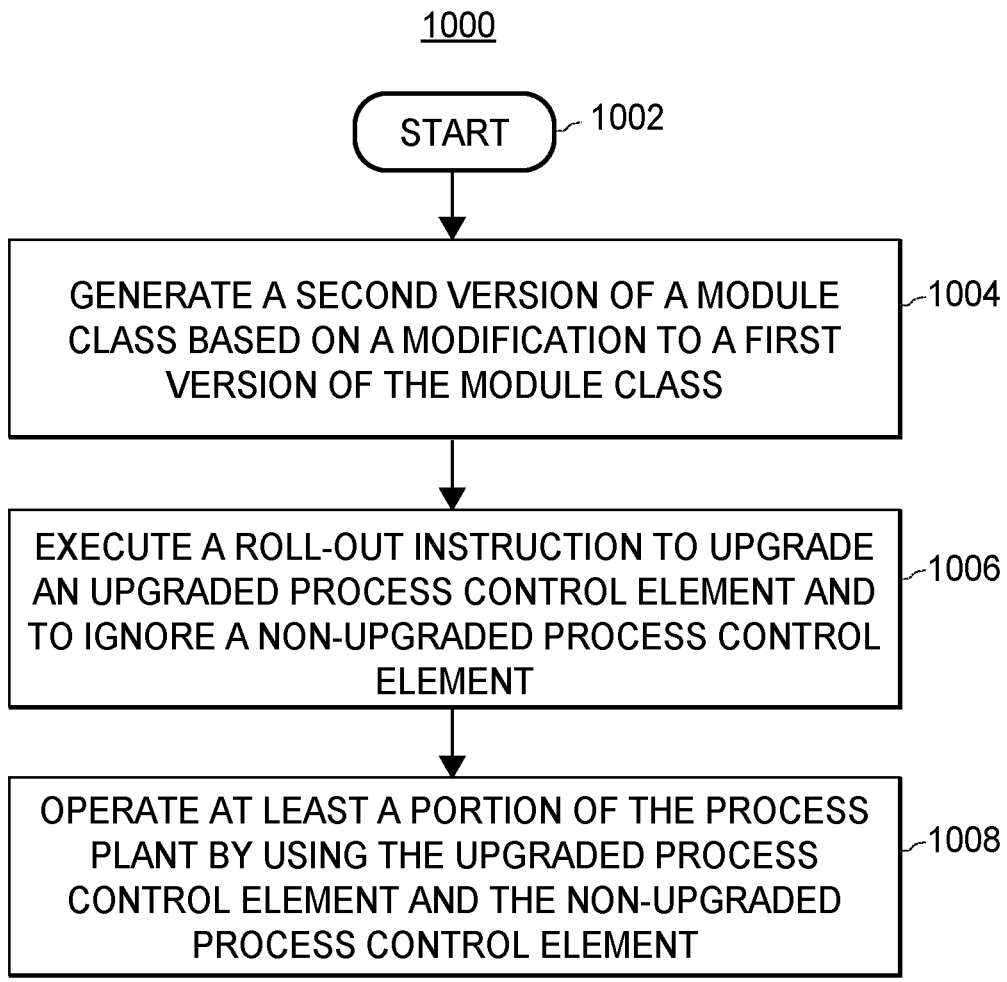
FIG. 10 illustrates an embodiment of a method for controlled roll-out of module classes for configuring the process plant of FIG. 1.

FIG. 10 illustrates an embodiment of a method 1000 for controlled roll-out of module classes for configuring the process plant 10. Method 1000 begins (1002) at block 1004 where one or more processors (e.g., one or more processors executing on one or more of the workstations 14 of FIG. 1) generate a second version of a module class (e.g., 2-State Valve module class 356) based on a modification to a first version of the module class (e.g., 2-State Valve module class 256). In some embodiments, the module class may be a derived module class as described herein (e.g., 2-State Valve IL module class 257 or 2-State Valve IL module class 357). The module class may be associated with one or more module instances, where the module instances may each be associated with a process control element of the process plant, including, for example, a field device such as a valve, as described herein. The second version of the module class may correspond to a changed process control element of the process plant, including, for example, a hardware change where one process control element is replaced with another process control element. In some embodiments, the modification to the first version of the module class can include adding one or more inputs (e.g., feedback inputs) to the module class, where the one or more inputs may be accessed to facilitate at least partial control of the upgraded process control element.

At block 1006, a roll-out instruction is executed by the one or more processors to update one or more upgraded process control elements. The roll-out instruction causes each of the upgraded process control elements to become associated with a new module instance based on the second version of the module class (e.g., the 2-State Valve module class 356). The roll-out instruction may also be implemented to ignore, for example, to skip, one or more non-upgraded process control elements, where the non-upgraded process control elements each remain associated with a previous module instance based on the first version of the module class (e.g., 2-State Valve module class 256).

In some embodiments, the roll-out instruction may be implemented via selective upgrade routine, where the selective upgrade routine associates the upgraded process control elements with the new module instances based on the second version of the module class. The selective upgrade routine would simply ignore or skip the non-upgraded process control elements, such that the non-upgraded process control elements do not become associated with any second new module instance based on the second version of the module class.

As described herein, in some embodiments, the roll-out instruction may be executed immediately. In other embodiments, the roll-out instruction may be executed at a scheduled time.

At block 1008, once the roll-out instruction has been executed, each of the upgraded process control elements and the non-upgraded process control elements may be used together to control at least a portion of the process plant 10. In such embodiments, the process plant 10 would be controlled by different versions, for example, the first version and the second version, of the same module class.

The module-based systems and methods may be configured to track via a module configuration record the one or more module instances. In some embodiments, the module configuration record can indicate a version of the module class for each of the one or more module instances. The module configuration record may also indicate that the module class has a phased roll-out state.

In some embodiments, the module-based systems and methods may be configured to prevent additional updating of the module class when the module configuration record indicates that the module class has a phased roll-out state.

In still further embodiments, the upgraded process control elements may be included in an upgraded process control element set that defines each process control element to be associated with a new module instance of the second version of the module class (e.g., the 2-State Valve module class 356). The upgraded process control element set can be created when the roll-out instruction executes. In some embodiments the upgraded process control element set may be a subset of all process control elements of the process plant.

Selection of the process control elements to include in the upgraded process control element set may be received by the module-based systems and methods including, for example, via a graphical interface where an operator can select which process control elements to include in the upgraded process control element set.

For example, in some embodiments, selection of the upgraded process control element set may include selecting process control elements associated with a particular derived module class. In other embodiments, selection of the upgraded process control element set may include selecting process control elements associated with a particular hierarchy of the process plant. In still further embodiments, selection of the upgraded process control element set may include selecting process control elements associated with a physical area of the plant.

In various embodiments, an additional roll-out instruction may be executed that applies a configuration change to each of the new module instances based on the second version of the module class (e.g., the 2-State Valve module class 356) and to the previous module instances based on the first version of the module class (e.g., the 2-State Valve module class 256). The configuration change can include an additional modification that is applied to each of the second version of a module class and the first version of the module class. For example, in one embodiment, the additional modification can add calculation functionality to each of the second version of a module class and the first version of the module class in order to enhance the module class across both versions.

ADDITIONAL CONSIDERATIONS

When implemented, any of the software described herein may be stored in any computer readable memory such as on a magnetic disk, a laser disk, or other storage medium, in a RAM or ROM of a computer or processor, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A module-based system for implementing controlled roll-out of module classes for configuring a process plant, the module-based system comprising:
  a processor communicatively coupled to one or more process controllers of the process plant, the processor configured to communicate with the one or more process controllers to control a plurality of process control elements of the process plant, the plurality of process control elements comprising at least an upgraded process control element and a non-upgraded process control element; and
  a memory communicatively coupled to the processor, the memory configured to store a plurality of module classes for distributed network-based configuration of the plurality of process control elements of the process plant,
  wherein the processor is configured to:
  generate a second version of a module class, the module class selected from the plurality of module classes, and the second version based on a modification to a first version of the module class, the module class associated with one or more module instances, wherein each module instance is associated with a process control element of the one or more process control elements of the process plant, execute a roll-out instruction, the roll-out instruction updating the upgraded process control element, wherein the upgraded process control element is associated with a new module instance based on the second version of the module class, and the roll-out instruction ignoring the non-upgraded process control element, wherein the non-upgraded process control element remains associated with a previous module instance based on the first version of the module class, and track via a module configuration record the one or more module instances, the module configuration record indicating a version of the module class for each of the one or more module instances, and the module configuration record indicating that the module class has a phased roll-out state.

2. The module-based system of claim 1 further configured to operate at least a portion of the process plant by using the upgraded process control element and the non-upgraded process control element.

3. The module-based system of claim 1 further configured to execute the roll-out instruction with a selective upgrade routine, wherein the selective upgrade routine associates the upgraded process control element with the new module instance based on the second version of the module class, and wherein the selective upgrade routine does not associate the non-upgraded process control element with a second new module instance based on the second version of the module class.

4. The module-based system of claim 1 further configured to prevent additional updating of the module class when the module configuration record indicates that the module class has a phased roll-out state.

5. The module-based system of claim 1, wherein the module class is a derived module class.

6. The module-based system of claim 1, where the roll-out instruction is executed immediately.

7. The module-based system of claim 1, where the roll-out instruction is executed at a scheduled time.

8. The module-based system of claim 1, wherein a particular process control element is a field device.

9. The module-based system of claim 8, wherein the field device is a valve.

10. The module-based system of claim 1, wherein the second version of the module class corresponds to a changed process control element of the process plant.

11. The module-based system of claim 1, wherein the modification to the first version of the module class includes adding one or more inputs to the module class, and wherein the module-based system is further configured to access the one or more inputs to facilitate at least partial control of the upgraded process control element.

12. The module-based system of claim 11, wherein the one or more inputs to the module class are one or more feedback inputs.

13. The module-based system of claim 1, wherein the upgraded process control element is included in an upgraded process control element set, the upgraded process control element set defining each process control element to be associated with a new module instance of the second version of the module class when executed by the roll-out instruction, wherein the upgraded process control element set comprises a subset of all process control elements of the process plant.

14. The module-based system of claim 13, operable to receive one or more process control element selections, the process control element selections indicating each process control element to include in the upgraded process control element set.

15. The module-based system of claim 14, wherein the one or more process control element selections are received via a graphical interface.

16. The module-based system of claim 13, wherein the upgraded process control element set includes process control elements associated with a particular derived module class.

17. The module-based system of claim 13, wherein the upgraded process control element set includes process control elements associated with a particular hierarchy of the process plant.

18. The module-based system of claim 13, wherein the upgraded process control element set includes process control elements associated with a physical area of the plant.

19. The module-based system of claim 1 further configured to execute an additional roll-out instruction, the additional roll-out instruction applying a configuration change to the new module instance based on the second version of the module class and to the previous module instance based on the first version of the module class, wherein the configuration change includes an additional modification to each of the second version of a module class and the first version of the module class.

20. The module-based system of claim 19, wherein the additional modification adds a calculation functionality to each of the second version of a module class and the first version of the module class.

21. A module-based method for implementing controlled roll-out of module classes for configuring a process plant using one or more processors, the method comprising:

generating, by a processor commutatively coupled to one or more process controllers of the process plant and in communication with the one or more process controllers for controlling a plurality of process control elements of the process plant, the plurality of process control elements comprising at least an upgraded process control element and a non-upgraded process control element, a second version of a module class based on a modification to a first version of the module class selected from a plurality of module classes, the module class associated with one or more module instances, wherein each module instance is associated with a process control element of the process plant;

executing a roll-out instruction, by the processor, the roll-out instruction updating the upgraded process control element, wherein the upgraded process control element is associated with a new module instance based on the second version of the module class, and the roll-out instruction ignoring the non-upgraded process control element, wherein the non-upgraded process control element remains associated with a previous module instance based on the first version of the module class; and tracking via a module configuration record the one or more module instances, the module configuration record indicating a version of the module class for each of the one or more module instances, and the module configuration record indicating that the module class has a phased roll-out state.

22. The module-based method of claim 21 further configured to operate at least a portion of the process plant by using the upgraded process control element and the non-upgraded process control element.

23. The module-based method of claim 21 further configured to execute the roll-out instruction with a selective upgrade routine, wherein the selective upgrade routine associates the upgraded process control element with the new module instance based on the second version of the module class, and wherein the selective upgrade routine does not associate the non-upgraded process control element with a second new module instance based on the second version of the module class.

24. The module-based method of claim 21 further configured to prevent additional updating of the module class when the module configuration record indicates that the module class has a phased roll-out state.

25. The module-based method of claim 21, wherein the module class is a derived module class.

26. The module-based method of claim 21, where the roll-out instruction is executed immediately.

27. The module-based method of claim 21, where the roll-out instruction is executed at a scheduled time.

28. The module-based method of claim 21, wherein a particular process control element is a field device.

29. The module-based method of claim 28, wherein the field device is a valve.

30. The module-based method of claim 21, wherein the second version of the module class corresponds to a changed process control element of the process plant.

31. The module-based method of claim 21, wherein the modification to the first version of the module class includes adding one or more inputs to the module class, and wherein the module-based system is further configured to access the one or more inputs to facilitate at least partial control of the upgraded process control element.

32. The module-based method of claim 31, wherein the one or more inputs to the module class are one or more feedback inputs.

33. The module-based method of claim 21, wherein the upgraded process control element is included in an upgraded process control element set, the upgraded process control element set defining each process control element to be associated with a new module instance of the second version of the module class when executed by the roll-out instruction, wherein the upgraded process control element set comprises a subset of all process control elements of the process plant.

34. The module-based method of claim 33, operable to receive one or more process control element selections, the process control element selections indicating each process control element to include in the upgraded process control element set.

35. The module-based method of claim 34, wherein the one or more process control element selections are received via a graphical interface.

36. The module-based method of claim 33, wherein the upgraded process control element set includes process control elements associated with a particular derived module class.

37. The module-based method of claim 33, wherein the upgraded process control element set includes process control elements associated with a particular hierarchy of the process plant.

38. The module-based method of claim 33, wherein the upgraded process control element set includes process control elements associated with a physical area of the plant.

39. The module-based method of claim 21 further configured to execute an additional roll-out instruction, the additional roll-out instruction applying a configuration change to the new module instance based on the second version of the module class and to the previous module instance based on the first version of the module class, wherein the configuration change includes an additional modification to each of the second version of a module class and the first version of the module class.

40. The module-based method of claim 39, wherein the additional modification adds a calculation functionality to each of the second version of a module class and the first version of the module class.

41. A module-based system for implementing controlled roll-out of module classes for configuring a process plant, the module-based system comprising:
   a processor communicatively coupled to one or more process controllers of the process plant, the processor configured to communicate with the one or more process controllers to control a plurality of process control elements of the process plant, the plurality of process control elements comprising at least an upgraded process control element and a non-upgraded process control element; and
   a memory communicatively coupled to the processor, the memory configured to store a plurality of module classes for distributed network-based configuration of the plurality of process control elements of the process plant,
   wherein the processor is configured to:
   generate a second version of a module class, the module class selected from the plurality of module classes, and the second version based on a modification to a first version of the module class, the module class associated with one or more module instances, wherein each module instance is associated with a process control element of the one or more process control elements of the process plant, and
   execute a roll-out instruction, the roll-out instruction updating the upgraded process control element, wherein the upgraded process control element is associated with a new module instance based on the second version of the module class, and the roll-out instruction ignoring the non-upgraded process control element, wherein the non-upgraded process control element remains associated with a previous module instance based on the first version of the module class,
   wherein the modification to the first version of the module class includes adding one or more inputs to the module class, and wherein the module-based system is further configured to access the one or more inputs to facilitate at least partial control of the upgraded process control element, and
   wherein the one or more inputs to the module class are one or more feedback inputs.

42. A module-based method for implementing controlled roll-out of module classes for configuring a process plant using one or more processors, the method comprising:
   generating, by a processor commutatively coupled to one or more process controllers of the process plant and in communication with the one or more process controllers for controlling a plurality of process control elements of the process plant, the plurality of process control elements comprising at least an upgraded process control element and a non-upgraded process control element, a second version of a module class based on a modification to a first version of the module class selected from a plurality of module classes, the module class associated with one or more module instances, wherein each module instance is associated with a process control element of the process plant; and executing a roll-out instruction, by the processor, the roll-out instruction updating the upgraded process control element, wherein the upgraded process control element is associated with a new module instance based on the second version of the module class, and the roll-out instruction ignoring the non-upgraded process control element, wherein the non-upgraded process control element remains associated with a previous module instance based on the first version of the module class, wherein the modification to the first version of the module class includes adding one or more inputs to the module class, and wherein the module-based system is further configured to access the one or more inputs to facilitate at least partial control of the upgraded process control element, and wherein the one or more inputs to the module class are one or more feedback inputs.

* * * * *